United States Patent
Kuschnerus et al.

(10) Patent No.: US 11,947,432 B2
(45) Date of Patent: Apr. 2, 2024

(54) FAIL-SAFE BUS SYSTEM FOR A PROCESS SYSTEM

(71) Applicant: KROHNE Messtechnik GmbH, Duisburg (DE)

(72) Inventors: Dirk Kuschnerus, Krefeld (DE); Lars Lemke, Duisburg (DE); Sven Walbrecker, Wesel (DE)

( * ) Notice: Subject to any disclaimer, the term of this patent is extended or adjusted under 35 U.S.C. 154(b) by 283 days.

(21) Appl. No.: 17/366,803

(22) Filed: Jul. 2, 2021

(65) Prior Publication Data
US 2022/0004473 A1 Jan. 6, 2022

(30) Foreign Application Priority Data
Jul. 3, 2020 (DE) .......................... 102020117632.5

(51) Int. Cl.
| | | |
|---|---|---|
| G06F 11/22 | (2006.01) | |
| G06F 11/30 | (2006.01) | |
| G06F 13/374 | (2006.01) | |
| G06F 13/40 | (2006.01) | |

(52) U.S. Cl.
CPC ........ *G06F 11/221* (2013.01); *G06F 11/3027* (2013.01); *G06F 13/374* (2013.01); *G06F 13/4022* (2013.01)

(58) Field of Classification Search
CPC .. G06F 11/221; G06F 11/3027; G06F 13/374; G06F 13/4022
See application file for complete search history.

(56) References Cited

U.S. PATENT DOCUMENTS

| | | | |
|---|---|---|---|
| 6,466,539 B1* | 10/2002 | Kramer | G06F 11/0757 |
| | | | 714/E11.017 |
| 6,502,019 B1 | 12/2002 | Zydek et al. | |
| 10,581,633 B2* | 3/2020 | Pollmann | H04L 12/40189 |
| 2009/0044041 A1 | 2/2009 | Armbruster et al. | |
| 2011/0013624 A1* | 1/2011 | Lerzer | G06F 13/4022 |
| | | | 370/360 |
| 2012/0210030 A1* | 8/2012 | Karl | G05B 19/0421 |
| | | | 710/110 |
| 2012/0265359 A1 | 10/2012 | Das et al. | |
| 2016/0210255 A1* | 7/2016 | Wicki | H04L 12/4625 |
| 2016/0217090 A1* | 7/2016 | Sengoku | G06F 13/36 |
| 2016/0275029 A1* | 9/2016 | Michael Pohle | G06F 13/362 |

(Continued)

FOREIGN PATENT DOCUMENTS

| | | |
|---|---|---|
| AT | 12998 U1 | 3/2013 |
| DE | 19800311 A1 | 7/1999 |

(Continued)

*Primary Examiner* — Matthew M Kim
*Assistant Examiner* — Indranil Chowdhury
(74) *Attorney, Agent, or Firm* — Patrick D. Duplessis

(57) ABSTRACT

A bus system for a process system, having a first bus subscriber which transmits bus messages and having at least one first bus subscriber which receives bus messages, wherein the transmitting first bus subscriber and the receiving first bus subscriber are connected to one another via a first data bus, wherein the transmitting first bus subscriber is designed such that it transmits control commands to the receiving first bus subscriber, wherein the receiving first bus subscriber is designed such that it executes the control commands of the transmitting first bus subscriber and achieves the object of providing a bus system that is designed to be fail-safe in a special way.

15 Claims, 4 Drawing Sheets

(56) References Cited

U.S. PATENT DOCUMENTS

| | | | | |
|---|---|---|---|---|
| 2016/0275783 A1* | 9/2016 | Lewonig | ............... | H04L 12/403 |
| 2016/0292106 A1* | 10/2016 | Spiegel | ............ | H04L 12/40202 |
| 2018/0046161 A1 | 2/2018 | Yhr | | |
| 2019/0095370 A1* | 3/2019 | Fuchs | ................... | G06F 21/606 |
| 2019/0146940 A1* | 5/2019 | Fuchs | ..................... | G06F 13/24 |
| | | | | 710/113 |
| 2019/0149356 A1* | 5/2019 | Fuchs | ................ | H04L 41/0627 |
| | | | | 710/11 |
| 2019/0302742 A1* | 10/2019 | Grosch | ............ | H04L 12/40202 |
| 2022/0129402 A1* | 4/2022 | Li | ........................... | G06F 11/20 |

FOREIGN PATENT DOCUMENTS

| | | | | |
|---|---|---|---|---|
| DE | 102012102173 A1 | 10/2012 | | |
| EP | 1763454 B1 | 7/2008 | | |
| EP | 3278185 A1 | 2/2018 | | |
| EP | 3343853 A1 * | 7/2018 | .......... | G06F 11/2002 |
| WO | WO-2009040298 A1 * | 4/2009 | ......... | G06F 12/0661 |
| WO | WO-2015047386 A1 * | 4/2015 | .......... | G06F 11/1625 |
| WO | WO-2016155763 A1 * | 10/2016 | | |
| WO | WO-2016156204 A1 * | 10/2016 | .......... | B60W 50/023 |

* cited by examiner

FAIL-SAFE BUS SYSTEM FOR A PROCESS SYSTEM

TECHNICAL FIELD

The invention relates to a bus system for a process system, having a first bus subscriber which transmits bus messages and having at least one first bus subscriber which receives bus messages, wherein the transmitting first bus subscriber and the receiving first bus subscriber are connected to one another via a first data bus, wherein the transmitting first bus subscriber is designed such that it sends control commands to the receiving first bus subscriber, the receiving first bus subscriber being designed such that it executes the control commands of the transmitting first bus subscriber.

BACKGROUND

Bus systems of the type in question have been in use for many years wherever sensors and actuators are distributed locally in a technical process to be controlled and monitored and are in communication with each other via a common data bus. Most of these are bus systems with serial data buses, which are referred to as field bus systems in the application shown. Depending on the technical field (process industry, automotive, buildings, etc.), fieldbus systems have become established whose underlying protocols have certain advantages. In the process industry, for example, bus systems based on the HART, CANopen or Profibus standards are frequently found, in the automotive sector CAN, and in applications with time-deterministic requirements, for example, FlexRay or TTP.

As a general rule, several bus subscribers are installed in a process system and connected via a data bus and are controlled, for example, by a bus subscriber, which thus has an administrative function. The administrative function can, for example, consist of the implementation of a facility control system in which the administrative bus subscriber sends control commands to other bus subscribers of the bus system. This understanding underlies the designations used here when talking about a transmitting first bus subscriber and at least one receiving first bus subscriber. The transmitting first bus subscriber thus has the function of the administrative bus subscriber and sends control commands to the receiving first bus subscribers via the first data bus. This does not preclude the transmitting first bus subscriber from also receiving messages via the first data bus from other first bus subscribers, for example sensor values. The receiving first bus subscribers receive the control commands addressed to them. This also does not preclude the receiving first bus subscribers from also transmitting bus messages themselves via the first data bus in addition to receiving control commands. It is important to note that in the event of a malfunction of the administrative bus subscriber, i.e., the transmitting first bus subscriber, there is a massive impairment of the process system, since the receiving first bus subscribers are no longer controlled. This is usually accompanied by a complete failure of the process system.

In the prior art, it is known to reduce the probability of failure associated with a malfunction of the transmitting first bus subscriber by making the transmitting first bus subscriber redundant; this is associated with high costs.

SUMMARY

Accordingly, the object of the invention is to provide a bus system that is designed to be fail-safe in a special way.

The object is achieved by the bus system according to the invention with the disclosed features.

The bus system according to the invention is characterized in that a transmitting second bus subscriber and at least one receiving second bus subscriber are present. The transmitting second bus subscriber and the receiving second bus subscriber are connected to one another via a second data bus. Furthermore, the transmitting second bus subscriber is designed to transmit control commands to the receiving second bus subscriber, whereas the receiving second bus subscriber is designed to execute the control commands of the transmitting second bus subscriber.

The transmitting first bus subscriber and the transmitting second bus subscriber are connected to each other via a monitoring communication channel and are designed to functionally monitor each other. The first data bus and the second data bus can be connected to one another and disconnected from one another via a switching device controllable by at least one circuit unit. In the go state of the transmitting first bus subscriber and the transmitting second bus subscriber, the first data bus and the second data bus are separated from each other. The go state in this case is the state in which the transmitting first bus subscriber and the transmitting second bus subscriber are functional as prescribed and control the receiving bus subscribers, namely the receiving first bus subscriber and the receiving second bus subscriber.

It is further provided that the circuit unit is designed such that, in the event of a fault state of the transmitting first bus subscriber or in the event of a fault state of the transmitting second bus subscriber, it connects the first data bus and the second data bus to one another via the switching device. In the event that the transmitting second bus subscriber is in the fault state, the functional transmitting first bus subscriber is then connected to both the receiving first bus subscriber and the receiving second bus subscriber via the connected data buses. In the event that the transmitting first bus station is in the fault state, the functional transmitting second bus station is then connected to both the receiving second bus station and the receiving first bus station via the connected data buses.

In addition, the functional transmitting first bus subscriber and the functional transmitting second bus subscriber are designed to transmit control commands to both the receiving first bus subscriber and the receiving second bus subscriber when the other transmitting bus subscriber is in a fault state. The receiving bus subscribers are then designed to execute the control commands of the functioning transmitting bus subscriber.

According to the invention, it has thus been recognized that a bus system can be implemented in a particularly advantageous and fail-safe manner if it is divided into at least two bus segments, namely a first bus system and a second bus system. In the fault state of the transmitting first bus subscriber or in the fault state of the transmitting second bus subscriber, the two data buses of the two bus segments are connected to each other via the switching device so that the functional transmitting first bus subscriber or the functional transmitting second bus subscriber can take over the control of all receiving bus subscribers. The receiving bus subscribers are then designed to execute the control commands of each transmitting first bus subscriber. Communication between a transmitting first bus subscriber and a receiving second bus subscriber is then possible, for example.

In an alternative design, the object is achieved by the bus system having the disclosed features.

Here, too, there is a transmitting second bus subscriber and at least one receiving second bus subscriber. The transmitting second bus subscriber and the receiving second bus subscriber are connected to one another via a second data bus. The transmitting second bus subscriber is designed to transmit control commands to the receiving second bus subscriber and the receiving second bus subscriber is designed to execute control commands of the transmitting second bus subscriber.

Further, in this design, the transmitting first bus subscriber and the transmitting second bus subscriber are arranged to be connected to a transmitting alternate bus subscriber via a monitoring communication channel. The transmitting first bus subscriber and the transmitting second bus subscriber can, in this case, be connected to the transmitting substitute bus subscriber via a respective monitoring communication channel or be connected to the transmitting substitute bus subscriber via a respective monitoring communication channel of their own. Both variations are included if it is stated that the transmitting first bus subscriber and the transmitting second bus subscriber are connected to a transmitting substitute bus subscriber via a monitoring communication channel. Further, the transmitting substitute bus subscriber is designed to functionally monitor the transmitting first bus subscriber and the transmitting second bus subscriber.

The first data bus and the second data bus can be connected to one another and disconnected from one another via a switching device which can be controlled by at least one circuit unit. In the simultaneous go state of the transmitting first bus subscriber and the transmitting second bus subscriber, the first data bus and the second data bus are also separated from one another in this design according to the invention.

According to the invention, it is further provided that the circuit unit is designed such that, in the fault state of the transmitting first bus subscriber or in the fault state of the transmitting second bus subscriber, it connects the first data bus and the second data bus to one another via the switching device, so that the transmitting substitute bus subscriber connects, via the monitoring communication channel, the functional transmitting first bus subscriber, the first data bus and the second data bus to the receiving bus subscriber of the transmitting bus subscriber in the fault state, and that the transmitting substitute bus subscriber is designed such that it transmits control commands to the receiving first bus subscriber in the fault state of the transmitting first bus subscriber or transmits control commands to the receiving second bus subscriber in the fault state of the transmitting second bus subscriber.

In a particularly preferred design of the bus systems according to the invention, the receiving first bus subscriber and the receiving second bus subscriber are designed such that they send status data about their current operating status or data characterizing the process environment to the respective transmitting process subscribers. Data characterizing the process environment can, for example, be data describing the temperature prevailing at the location of the respective bus subscriber or the pressure prevailing at the location of the respective bus subscriber. The status data describing the current operating status of a bus subscriber can, for example, be data describing momentary settings of the bus subscriber. If the bus system is implemented, for example, in a filling system for filling flowable media into containers and if, for example, a receiving bus subscriber is designed as a filling valve, then the status data can be used, for example, to describe the degree of opening of the filling valve.

The receiving first bus subscriber and the receiving second bus subscriber are also designed such that they at least partially stop sending the status data or the data characterizing the process environment in the fault state of the transmitting first bus subscriber or in the fault state of the sending second bus subscriber. This ensures that the bandwidth of the interconnected data buses can be used primarily to drive the receiving bus subscribers, namely to send the control commands. Since the functional transmitting bus subscriber must now control all receiving bus subscribers via the data bus, or the interconnected first and second data buses, or since the functional transmitting bus subscriber and the substitute transmitting bus subscriber control the receiving bus subscribers at least partially via the same data bus, a larger bandwidth must be used for this purpose. The transmission of all secondary data, wherein secondary data here is data which is not absolutely necessary for the control of the bus subscribers and thus for the basic operation of the process system, can be reduced or completely stopped in order to avoid unnecessary utilization of the data bus.

Terminating or reducing the transmission of the status data or the data characterizing the process environment by the receiving first bus subscriber and/or the receiving second bus subscriber can be implemented in different ways. In a first implementation, the transmitting first bus subscriber and the transmitting second bus subscriber or the transmitting substitute bus subscriber are designed such that, in the fault state of a transmitting bus subscriber, they request the receiving first bus subscriber and/or the receiving second bus subscriber to stop or at least partially reduce the transmission of the status data or the data characterizing the process environment. This request is then communicated in the form of a control command via the connected data buses to the receiving first bus subscriber and to the receiving second bus subscriber.

In an alternative implementation, it is provided that the receiving first bus subscriber and the receiving second bus subscriber are designed such that they independently detect the fault state of the transmitting first bus subscriber or the transmitting second bus subscriber and thereupon at least partially or completely stop transmitting the status data or the data characterizing the process environment.

The independent detection of a fault condition of the transmitting first bus station or the transmitting second bus station by the receiving bus station(s) can be implemented in different ways.

In one variant, the transmitting bus subscribers send a function signal at fixed time intervals to the receiving bus subscribers, which receive this signal. If the function signal is not received, it is concluded that the sending bus station has not sent out a function signal and must therefore be in an error state.

In another variation, the receiving bus subscribers send a request to the transmitting bus subscribers. In the absence of a response to the transmitted request, it is concluded that the corresponding transmitting bus subscriber is in a faulty state. The sending of the request is preferably repeated at predetermined time intervals.

It has been explained above that the transmitting first bus subscriber and the transmitting second bus subscriber are connected to each other via a monitoring communication channel and are designed to functionally monitor one another. The monitoring communication channel can be implemented as an analog or digital communication channel. Furthermore, the communication channel can be implemented as a wireless or wired communication channel. The monitoring communication channel can also be implemented accordingly in the variation of the bus system that has a transmitting substitute bus subscriber.

Mutual functional monitoring of the transmitting first bus subscriber and the transmitting second bus subscriber or the transmitting substitute bus subscriber and the transmitting first bus subscriber or transmitting second bus subscriber can also be implemented in different ways. In a particularly preferred implementation, the transmitting first bus subscriber transmits a function signal to the transmitting second bus subscriber or the transmitting substitute bus subscriber at regular intervals. Likewise, the transmitting second bus subscriber transmits a function signal to the transmitting first bus subscriber or the transmitting substitute bus subscriber at regular time intervals, preferably at the same time interval. If the function signal is not transmitted, the other bus subscriber or the transmitting substitute bus subscriber recognizes that a fault state exists here. In an alternative implementation, the transmitting first bus subscriber or the transmitting substitute bus subscriber requests the transmitting second bus subscriber to transmit a function signal at regular intervals. Likewise, the transmitting second bus subscriber or the transmitting substitute bus subscriber requests the transmitting first bus subscriber to transmit a function signal at regular intervals. If the requested bus subscriber does not respond, there is also a fault state that is detected by the requesting bus subscriber.

As previously explained, the circuit unit is used to connect the first data bus and the second data bus via the switching device. In a first design, the switching unit is implemented by a separate bus subscriber of the bus system.

In one variation, the separate bus subscriber is connected to the monitoring communication channel. In an alternative design, the circuit unit implemented as a separate bus subscriber is connected to the transmitting first bus subscriber and to the transmitting second bus subscriber via one channel each.

In a further design of the bus systems according to the invention, a moderating first bus subscriber and a moderating second bus subscriber are provided. The moderating first bus subscriber moderates the communication between the transmitting first bus subscriber and the receiving first bus subscriber. The moderating second bus station moderates the communication between the transmitting second bus station and the receiving second bus station.

In the fault state of the transmitting first bus subscriber, the moderating first bus subscriber is deactivated and the moderating second bus subscriber takes over the moderation of the communication between the transmitting second bus subscriber and the receiving first bus subscriber. In the fault state of the transmitting second bus subscriber, the moderating second bus subscriber is deactivated, and the moderating primary bus subscriber takes over the moderation of the communication between the transmitting first bus subscriber and the receiving second bus subscriber.

In one variation, the moderating first bus subscriber and the moderating second bus subscriber are implemented as separate bus subscribers or components.

In another variation, the moderating first bus subscriber and the moderating second bus subscriber are provided in the circuit unit.

In another variation, the moderating first bus subscriber is implemented in the transmitting first bus subscriber and the moderating second bus subscriber is implemented in the transmitting second bus subscriber.

In a particularly preferred design of the bus systems according to the invention, a second circuit unit is provided. Here, the first circuit unit is implemented in the transmitting first bus subscriber and the second circuit unit is implemented in the transmitting second bus subscriber.

In this design, the connection of the two circuit units to the switching device is implemented in different variations:

In a first variation, the first circuit unit and the second circuit unit are each connected to the switching device via a switching channel and switch the switching device via the respective switching channel.

In an alternative second variation, the switching device is connected to the monitoring communication channel and the first circuit unit, and the second circuit to unit switch the switching device via the monitoring communication channel.

In an alternative third variation, the first circuit unit switches the switching device via the first data bus and the second circuit unit switches the switching device via the second data bus.

The switching unit itself may be implemented in various ways. As has been explained previously, the circuit unit is designed such that it connects the first data bus and the second data bus via the switching device in the fault state of the transmitting first bus subscriber or the transmitting second bus subscriber. If two switching units are provided, both switching units perform this task independently of each other. The following implementations may be implemented for each of the two circuit units. However, the implementations are carried out—not restrictively—only for one circuit unit.

In order for the circuit unit to be able to switch the circuit device for connecting the first data bus and the second data bus in the fault state of one of the transmitting bus subscribers, it is necessary for the circuit unit to independently detect the state of the transmitting first bus subscriber and the state of the transmitting second bus subscriber or to obtain information about the states of the transmitting first bus subscriber and the transmitting second bus subscriber. In a first design, it is accordingly provided that the circuit unit is designed such that it independently detects the fault state of the transmitting first bus subscriber or the transmitting second bus subscriber. In one variation, this is implemented such that the transmitting first bus station and the transmitting second bus station transmit a function signal to the circuit unit at regular intervals. If this signal is not transmitted, the circuit unit detects that a fault state exists. In a second variation, the circuit unit is implemented such that it requests the transmitting first bus station and the transmitting second bus station to transmit a status signal. If the transmitting first bus subscriber or the transmitting second bus subscriber does not respond to this request, the circuit unit detects that a fault state of the non-responding transmitting bus subscriber is present.

In another design, the transmitting first bus subscriber and the transmitting second bus subscriber are designed to transmit a fault signal to the circuit unit in the event of a fault state of one of the transmitting bus subscribers. In the variation of the bus system with the transmitting substitute bus subscriber, the transmitting substitute bus subscriber can alternatively or additionally be designed such that it transmits a fault signal to the circuit unit in the fault state of one of the transmitting bus subscribers. A transmitting bus subscriber detects the fault state of the respective other transmitting bus subscriber as described above in that the two transmitting bus subscribers functionally monitor each other via the monitoring communication channel or that the transmitting substitute bus subscriber functionally monitors the other transmitting bus subscribers via the monitoring communication channel. Thus, if one of the transmitting bus subscribers or the substitute bus subscriber detects that the other transmitting bus subscriber is in a fault state, it transmits a corresponding fault signal to the circuit unit.

In an alternative design of the bus system according to the invention, it is provided that a second circuit unit and a second switching device are provided, wherein the first circuit unit and the first switching device are implemented in the transmitting first bus subscriber and the second circuit unit and the second switching device are implemented in the transmitting second bus subscriber. The transmitting first bus subscriber can then be connected to the second data bus and can be disconnected from the second data bus via the first switching device. The transmitting second bus subscriber can then be connected to the first data bus via the second switching device and can be disconnected from the first data bus. In this way, overall redundancy is implemented in the circuit unit, which considerably increases the reliability of the bus system according to the invention.

If a circuit unit is implemented as a separate bus subscriber, the switching device can be implemented in the circuit unit in one implementation.

As described, it is provided according to the invention that in the fault state of the transmitting second bus subscriber, the transmitting first bus subscriber takes over the control of the receiving second bus subscriber originally controlled by the transmitting second bus subscriber and vice versa. So that the transmitting first bus subscriber has access to all the information necessary for controlling the receiving second bus subscriber—for example data for designing the receiving second bus subscriber or data for controlling—control commands—the receiving second bus subscriber or also characterization information about the type of the receiving second bus subscriber—and, conversely, the transmitting second bus subscriber has access to all the information necessary for controlling the receiving first bus subscriber, it is provided in a particularly preferred design of the bus system according to the invention that the transmitting first bus subscriber and the transmitting second bus subscriber are designed such that, during initialization of the bus system, they exchange data for configuring and/or for controlling the receiving bus subscribers and/or characterization information of the receiving bus subscribers via the first data bus and the second data bus. For this, the first data bus and the second data bus are connected to each other via the switching device.

Initialization of the bus system is usually carried out before the bus system is put into operation, i.e., before the process system starts or resumes the process. Furthermore, the switching unit is designed such that it disconnects the first data bus and the second data bus via the switching device after the data has been exchanged. During the ongoing process, the transmitting bus subscribers then preferably do not exchange any further data for configuring and/or for controlling the receiving bus subscribers and/or characterization information of the receiving bus subscribers. This results in the advantage that in the event of a malfunction of one of the transmitting bus subscribers, the other transmitting bus subscriber can directly ensure the joint operation of the two bus segments, since all necessary information is available to it.

In an alternative design of the bus system according to the invention, the transmitting first bus subscriber and the transmitting second bus subscriber are designed such that they exchange data for configuring and/or for controlling of the receiving bus subscribers and/or characterization information of the receiving bus subscribers via the monitoring communication channel during initialization of the bus system and/or during operation of the bus system, i.e., during the ongoing process. This design has the advantage that an exchange of the transmitting first bus subscriber and the transmitting second bus subscriber is also possible in the case of separate data buses.

In the variation of the bus system according to the invention which has a transmitting substitute bus subscriber, it is provided that the transmitting first bus subscriber and the transmitting second bus subscriber are designed such that they transmit data for configuring and/or for controlling the receiving bus subscribers and/or characterization information of the receiving bus subscribers to the transmitting substitute bus subscriber via the monitoring communication channel during initialization of the bus system and/or during ongoing operation of the bus system.

In order to keep the load of the connected data buses low or to make the best possible use of the available bandwidth of the connected data buses even when the two bus segments are connected, namely in the fault state of the transmitting first bus subscriber or in the fault state of the transmitting second bus subscriber when the first data bus and the second data bus are connected, it is provided in a particularly preferred design of the bus system according to the invention.

The transmitting first bus subscriber is designed such that, in the event of interference to the transmitting second bus subscriber, it puts the receiving second bus subscriber into a follow mode such that the receiving second bus subscriber executes the control commands directed to the receiving first bus subscriber. The transmitting second bus subscriber is designed such that, in the fault state of the transmitting first bus subscriber, it puts the receiving second bus subscriber into a follow mode such that the receiving first bus subscriber executes the control commands directed to the receiving second bus subscriber. This allows resources to be reduced during data transmission via the data bus, since each receiving bus subscriber does not have to be controlled separately.

In order to increase the overall fail-safety of the bus systems, a further design of the bus systems according to the invention provides that the circuit unit is designed such that it connects the first data bus and the second data bus via the switching device when the transmitting first bus subscriber or the transmitting second bus subscriber is in a fault state, a requested response from one of the two transmitting bus subscribers fails to occur, or one of the two transmitting bus subscribers is switched off. Thus, a "fail-safe" situation is implemented, which serves to bring the bus system as a whole into a functional state, namely by connecting the two data buses as soon as a critical situation occurs.

All of the described designs can also be implemented if multiple receiving first bus subscribers and/or multiple receiving second bus subscribers are provided. The explanations apply accordingly to all receiving bus subscribers.

In a particularly preferred variation, the bus systems according to the invention are implemented as CAN bus systems and use the CANopen protocol. However, the invention is not limited to such a design; rather, all known protocols can be implemented in the bus systems according to the invention. Accordingly, the bus subscribers are selected such that they can be used in the desired protocol.

In addition, it is particularly preferred that the configuration of the transmitting bus subscribers and/or the circuit unit is implemented via the OPC Unified Architecture.

BRIEF DESCRIPTION OF THE DRAWINGS

In detail, there is a multitude of possibilities for designing and further developing the bus system according to the invention. In this regard, reference is made to the description of preferred embodiments in connection with the drawings.

DETAILED DESCRIPTION

Figure 1:
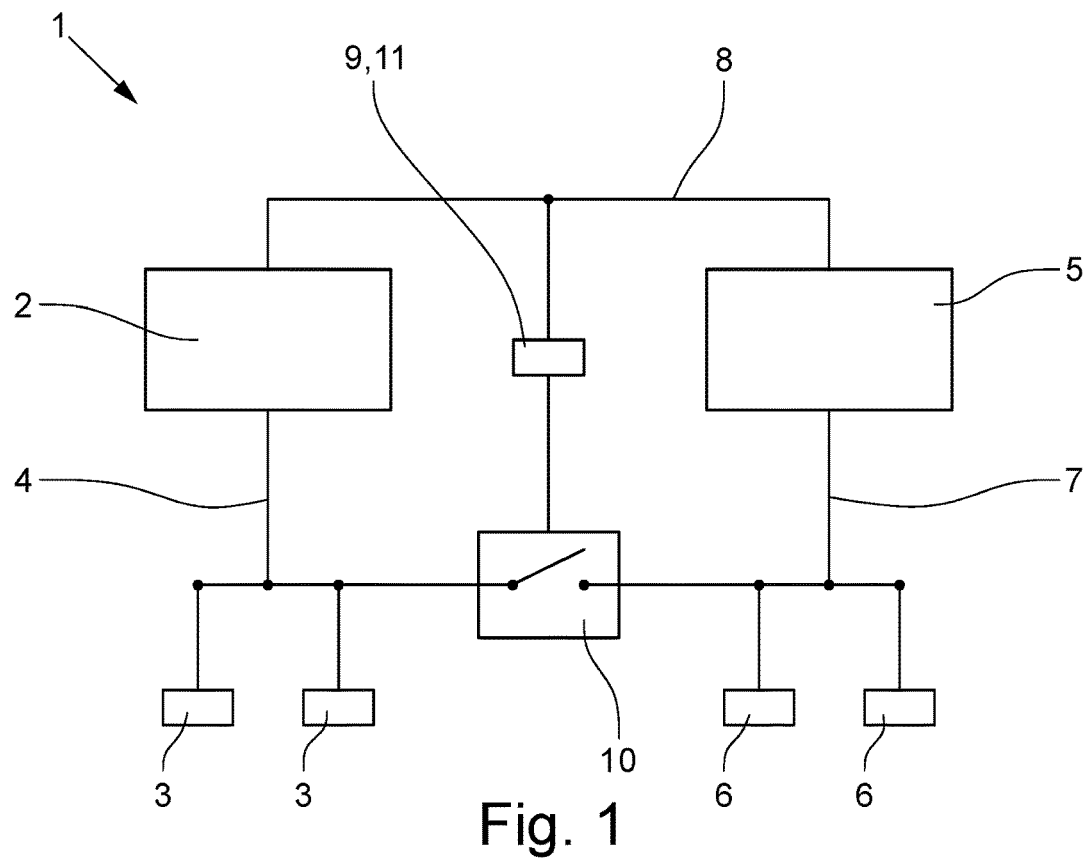
FIG. 1 illustrates a first embodiment of a bus system in the go state of the transmitting first bus subscriber and the transmitting second bus subscriber.

FIG. 1 shows a schematic representation of a first embodiment of a bus system 1 for a process system not shown. The bus system 1 has a transmitting first bus subscriber 2 and two receiving first bus subscribers 3. The transmitting first bus subscriber 2 is primarily characterized in that it transmits control commands to the receiving first bus subscribers 3 via a first data bus 4. The receiving first bus subscribers 3 are designed such that they can execute or do execute the control commands of the transmitting first bus subscriber 2. Furthermore, the bus system 1 has a transmitting second bus subscriber 5 and two receiving second bus subscribers 6. The transmitting second bus subscriber 5 is characterized in that it transmits control commands via a second data bus 7 to the receiving second bus subscribers 6, which in turn are designed to execute the control commands of the transmitting second bus subscriber 5.

The transmitting first bus subscriber 2 and the transmitting second bus subscriber 5 are connected to one another via a monitoring communication channel 8. In addition, the transmitting first bus subscriber 2 and the transmitting second bus subscriber 5 are designed such that they functionally monitor each other. For this, the transmitting first bus subscriber 2 transmits a function signal to the transmitting second bus subscriber 5 at regular time intervals, and the transmitting second bus subscriber 5 transmits a function signal to the transmitting first bus subscriber 2 at regular time intervals. When the function signal is not transmitted, the bus subscriber 2, 5 receiving the function signal detects that the bus subscriber 5, 2 transmitting the function signal has a malfunction, i.e., is in a malfunction state.

The bus system 1 has a circuit unit 9 which controls a switching device 10. The first data bus 4 and the second data bus 7 can be connected to one another via the switching device 10. In the embodiment shown in FIG. 1, the circuit unit 9 is designed as a separate bus subscriber 11. If the transmitting first bus subscriber 2 and the transmitting second bus subscriber 5 are in the go state, i.e., not in a fault state, the first data bus 4 and the second data bus 7 are separated from each other. This case is shown in FIG. 1. The circuit unit 9 is now designed such that it connects the first data bus 4 and the second data bus 7 to each other via the switching device 10 in the fault state of the transmitting first bus subscriber 2 or in the fault state of the transmitting second bus subscriber 5. In the event that the transmitting second bus subscriber 5 is in the fault state, the transmitting first bus subscriber 2 is then connected to both the receiving first bus subscribers 3 and the receiving second bus subscribers 6. If, on the other hand, the transmitting first bus subscriber 2 is in the fault state, the functional transmitting second bus subscriber 5 is connected both to the receiving second bus subscribers 6 and to the receiving first bus subscribers 3 by connecting the two data buses 4, 7.

Both the functional transmitting first bus subscriber 2 and the functional transmitting second bus subscriber 5 are designed such that they transmit control commands both to the receiving first bus subscribers 3 and to the receiving second bus subscribers 6 in the fault state of the respective other bus subscriber 2, 5. The receiving first bus subscriber 3 and the receiving second bus subscriber 6 are designed to execute the control commands. The transmitting first bus subscriber 2 and the transmitting second bus subscriber 5 are designed such that they transmit a fault signal to the circuit unit 9 in the fault state of the respective other transmitting bus subscriber 5, 2.

Figure 2:
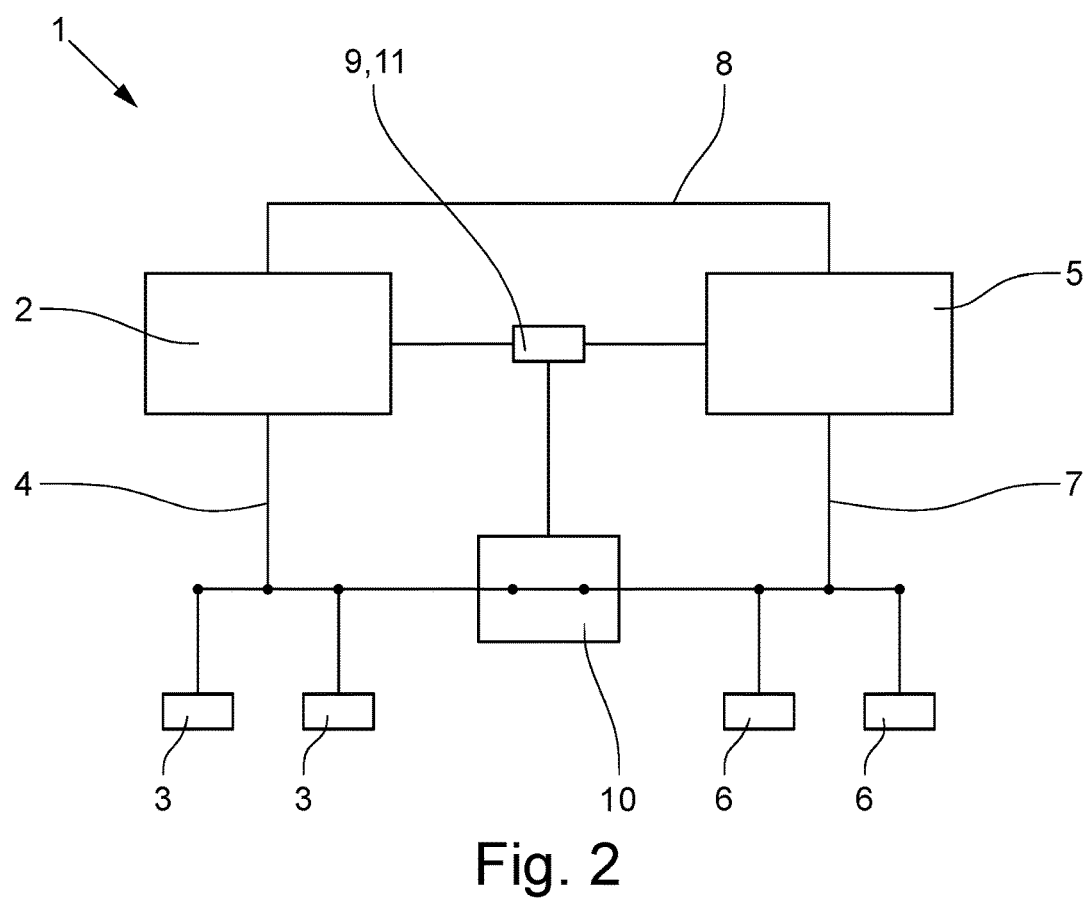
FIG. 2 illustrates a second embodiment of a bus system in the fault state of the transmitting second bus subscriber.

In the embodiment shown in FIG. 1, the circuit unit 9 is connected to the monitoring communication channel 8. The circuit unit 9 is controlled by the transmitting bus subscribers 2, 5 via the monitoring communication channel 8, which is designed as an analog communication channel in this case. In contrast, FIG. 2 shows an embodiment of the bus system 1 in which the circuit unit 9 is directly connected to both the transmitting first bus subscriber 2 and the transmitting second bus subscriber 5. In addition, the fault state of the transmitting first bus subscriber 2 is shown; the circuit unit 9 has connected the first data bus 4 and the second data bus 7 to each other via the switching device 10. The transmitting of the control commands is now carried out only by the transmitting second bus subscriber 5. Both the receiving first bus subscriber 3 and the receiving second bus subscriber 6 are designed such that, in the go state of the sending bus subscribers 2, 5, they send out status data about their current operating state and data characterizing the process environment to the transmitting bus subscribers 2, 5. In the depicted state of the bus system 1, namely in the fault state of the transmitting first bus subscriber 2, the receiving bus subscribers 3, 6 have stopped transmitting the status data and the data characterizing the process environment. The receiving second bus subscribers 6 have been requested to stop transmitting the corresponding data by the transmitting second bus subscriber 5. The receiving first bus subscribers 3, on the other hand, have independently detected the fault state of the transmitting first bus subscriber 2 and have stopped transmitting the status data and the data characterizing the process environment.

Terminating the transmission of the corresponding data reduces the utilization of the data buses 4, 7 so that the full available bandwidth of the data buses 4, 7 can be utilized for transmitting the control commands.

The bus system 1 shown in FIG. 2 also differs from the bus system 1 shown in FIG. 1 in that the monitoring communication channel 8 is designed as a digital communication channel. Furthermore, the circuit unit 9 is designed such that it independently detects a fault state of the transmitting first bus subscriber 2 or the transmitting second bus subscriber 5. In addition, the circuit unit 9 is designed to connect the first data bus 4 and the second data bus 7 via the switching device 10 when the transmitting first bus subscriber 2 or the transmitting second bus subscriber 5 is in a fault state, or a requested response of one of the two transmitting bus subscribers 2, 5 fails to occur, or one of the two transmitting bus subscribers 2, 5 is switched off.

Figure 3:
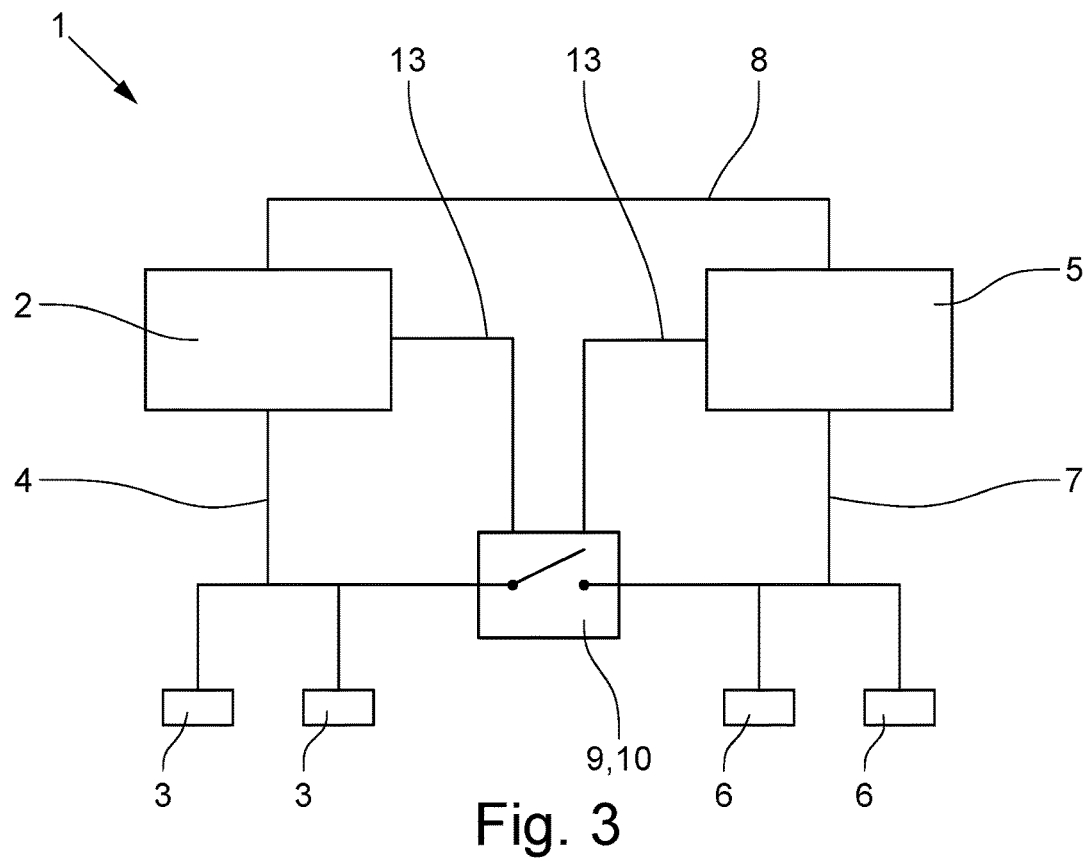
FIG. 3 illustrates a third embodiment of a bus system in the go state of the transmitting first bus subscriber and the transmitting second bus subscriber.

FIG. 3 shows a further embodiment of a bus system 1. Here, the circuit unit 9 and the switching device 10 are combined in one bus subscriber, so the circuit unit 9 is not implemented as a separate bus subscriber 11, as in FIGS. 1 and 2. The transmitting first bus subscriber 2 and the transmitting second bus subscriber 5 are connected to the circuit unit 9 via switching channels 13.

Figure 4:
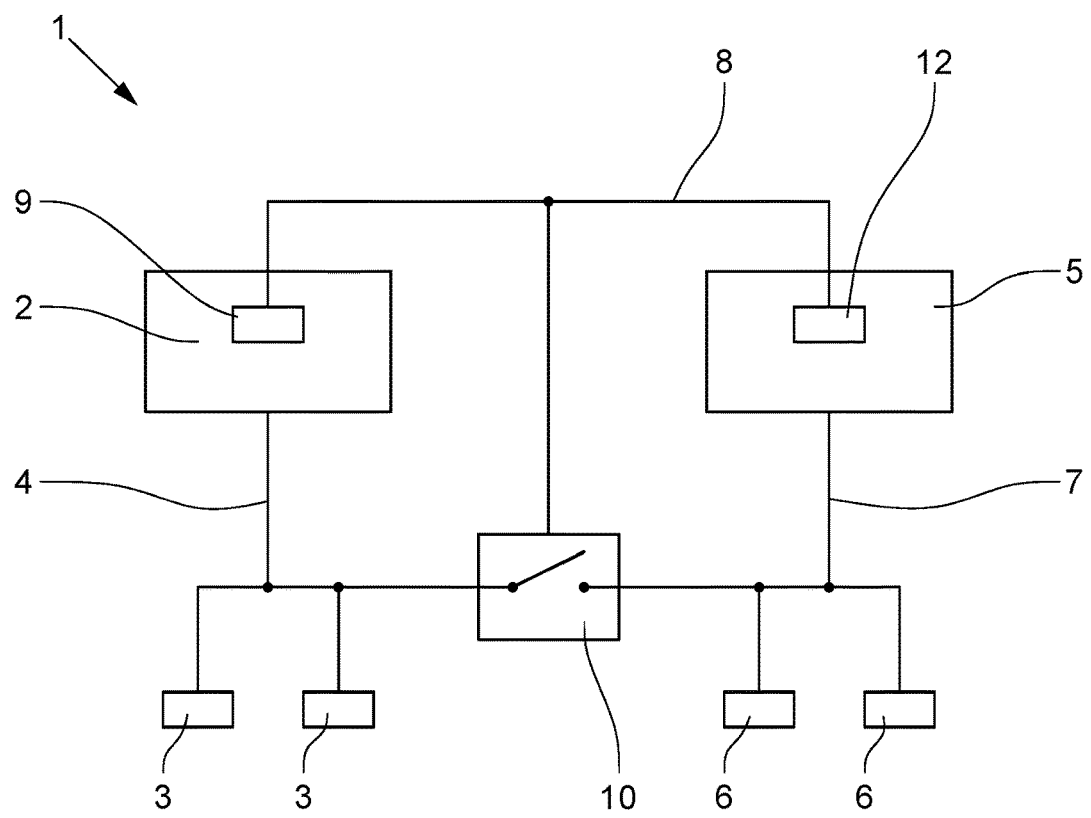
FIG. 4 illustrates a fourth embodiment of a bus system in the go state of the transmitting first bus station and the transmitting second bus station.

FIG. 4 shows a further variation of a bus system 1. The bus system 1 shown here has a second circuit unit 12. The first circuit unit 9 is implemented in the transmitting first bus subscriber 2, whereas the second circuit unit 12 is implemented in the transmitting second bus subscriber 5. The switching device 10, on the other hand, is connected to the monitoring communication channel 8 through which the first circuit unit 9 and the second circuit unit 12 can switch the switching device 10.

Figure 5:
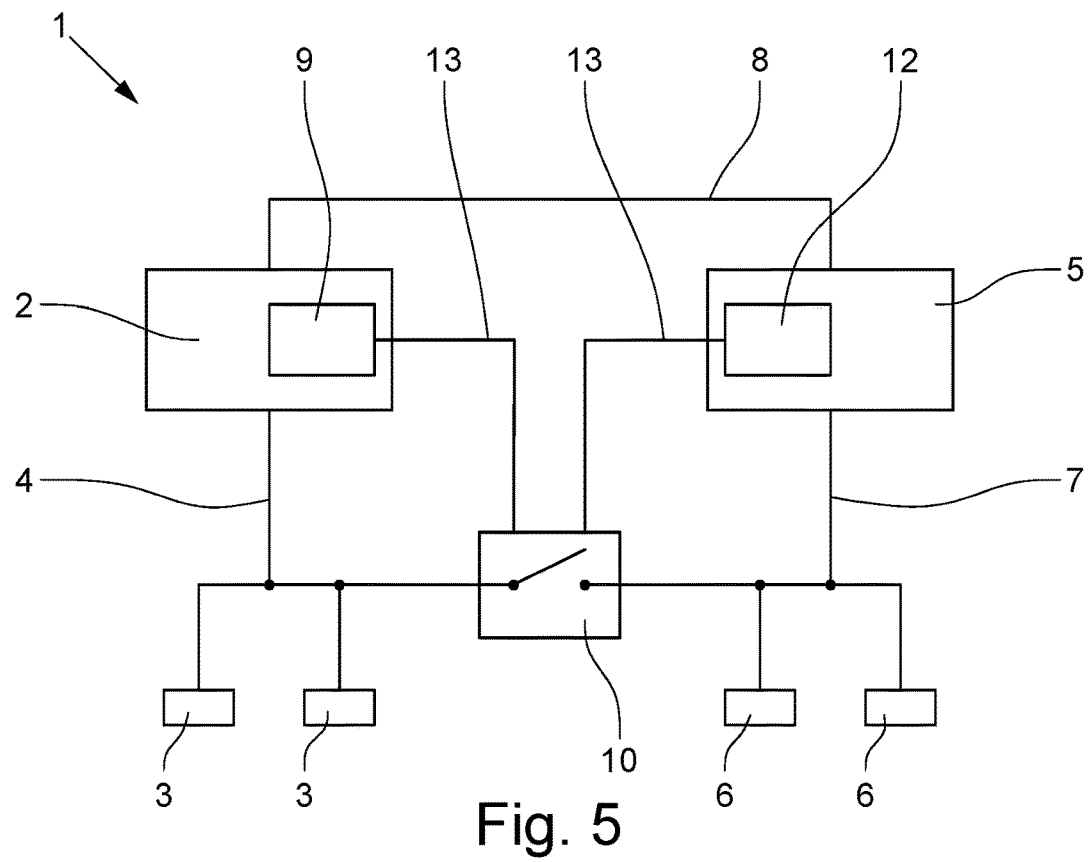
FIG. 5 illustrates a fifth embodiment of a bus system in the go state of the transmitting first bus subscriber and the transmitting second bus subscriber.

An alternative variation of the bus system 1 is shown in FIG. 5. Here, too, a first circuit unit 9 is implemented in the transmitting first bus subscriber 2 and a second circuit unit 12 is implemented in the transmitting second bus subscriber 5. However, the two circuit units 9, 12 are each connected to the switching device 10 via a switching channel 13 and switch the switching device 10 accordingly via the switching channels 13. The bus system 1 shown is also characterized in that the transmitting first bus subscriber 2 and the transmitting second bus subscriber 5 are designed such that, when the bus system is initialized, they exchange data for configuring and/or for controlling the receiving bus subscribers 3, 6 and/or characterization information of the receiving bus subscribers via the first data bus 4 and the second data bus 7. Initialization of the bus system 1 occurs before the bus system 1 enters its operating state and controls the process system. When the bus system is initialized, i.e., when the data is exchanged, the first data bus 4 and the second data bus 7 are connected to each other via the switching device 10. The circuit unit is designed to disconnect the first data bus 4 and the second data bus 7 via the switching device 10 after the exchange of the data.

In addition, in the embodiment shown, the transmitting first bus subscriber 2 is designed such that it puts the receiving second bus subscribers 6 into a follow mode in the event of interference from the transmitting second bus subscriber 5. This means that the receiving second bus subscribers 6 execute the control commands directed to the receiving first bus subscribers 3 and do not receive separate control commands.

Figure 6:
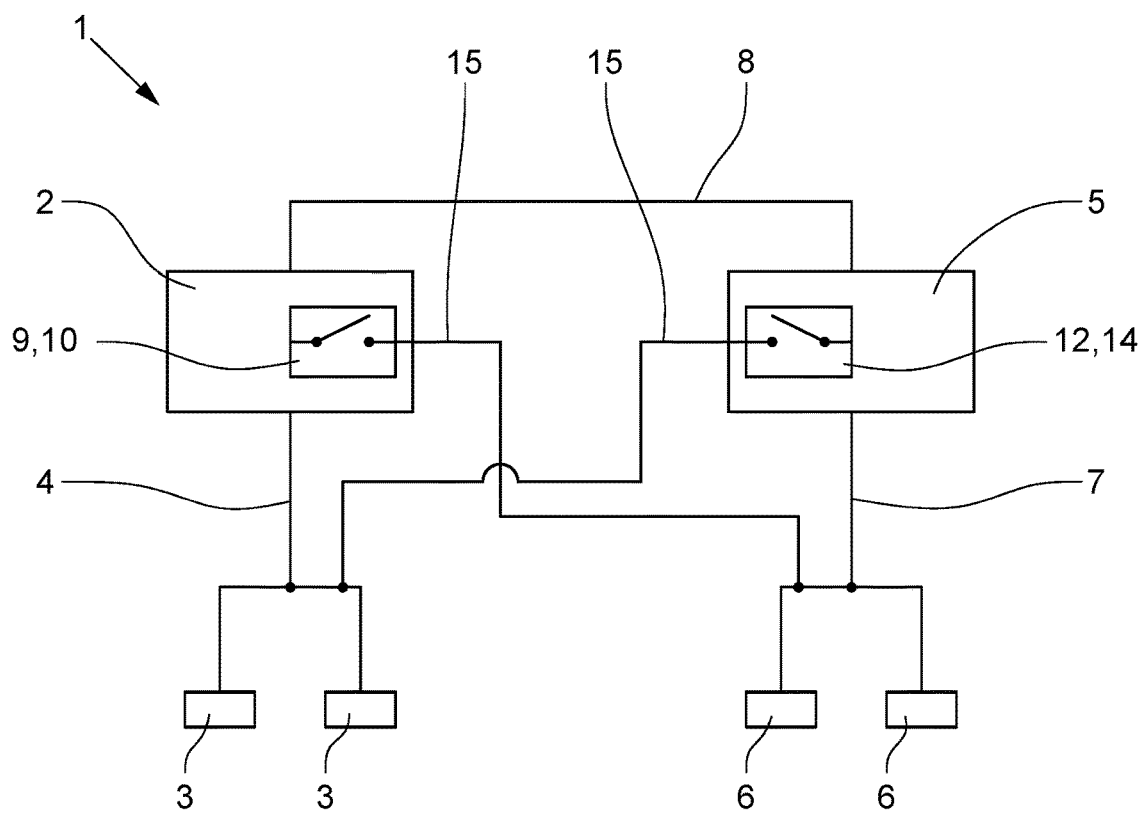
FIG. 6 illustrates a sixth embodiment of a bus system in the go state of the transmitting first bus subscriber and the transmitting second bus subscriber.

FIG. 6 shows another bus system 1. The transmitting first bus subscriber 2 and the transmitting second bus subscriber 5 are designed here such that they exchange data for configuring and/or for controlling the receiving bus subscribers and characterization information of the receiving bus subscribers via the monitoring communication channel 8 during initialization of the bus system and during ongoing operation of the bus system. In contrast to the bus system shown in FIG. 5, data exchange is thus also possible during ongoing operation. However, the monitoring communication channel 8 must be designed such that the entire data can be transmitted. This means that there is no longer only mutual function monitoring of the two transmitting bus subscribers 2, 5 via the monitoring communication channel.

Furthermore, the bus system shown in FIG. 6 is characterized in that, in addition to a second circuit unit 12, a second switching device 14 is also provided. The first circuit unit 9 and the first switching device 10 are implemented in the transmitting first bus subscriber 2. The second circuit unit 12 and the second switching device 14 are implemented in the transmitting second bus subscriber 5. The transmitting first bus subscriber 2 can be connected to the second data bus 7 via the first switching device 10 and can be disconnected from the second data bus 7, whereas the transmitting second bus subscriber 5 can be connected to the first data bus 4 via the second switching device 14 and can be disconnected from the first data bus 4.

By connecting the transmitting first bus subscriber 2 to the second data bus 7, the first data bus 4 and the second data bus 7 are also connected to each other. By connecting the transmitting second bus subscriber 5 to the first data bus 4, the first data bus 4 and the second data bus 7 are also connected to each other.

Figure 7:
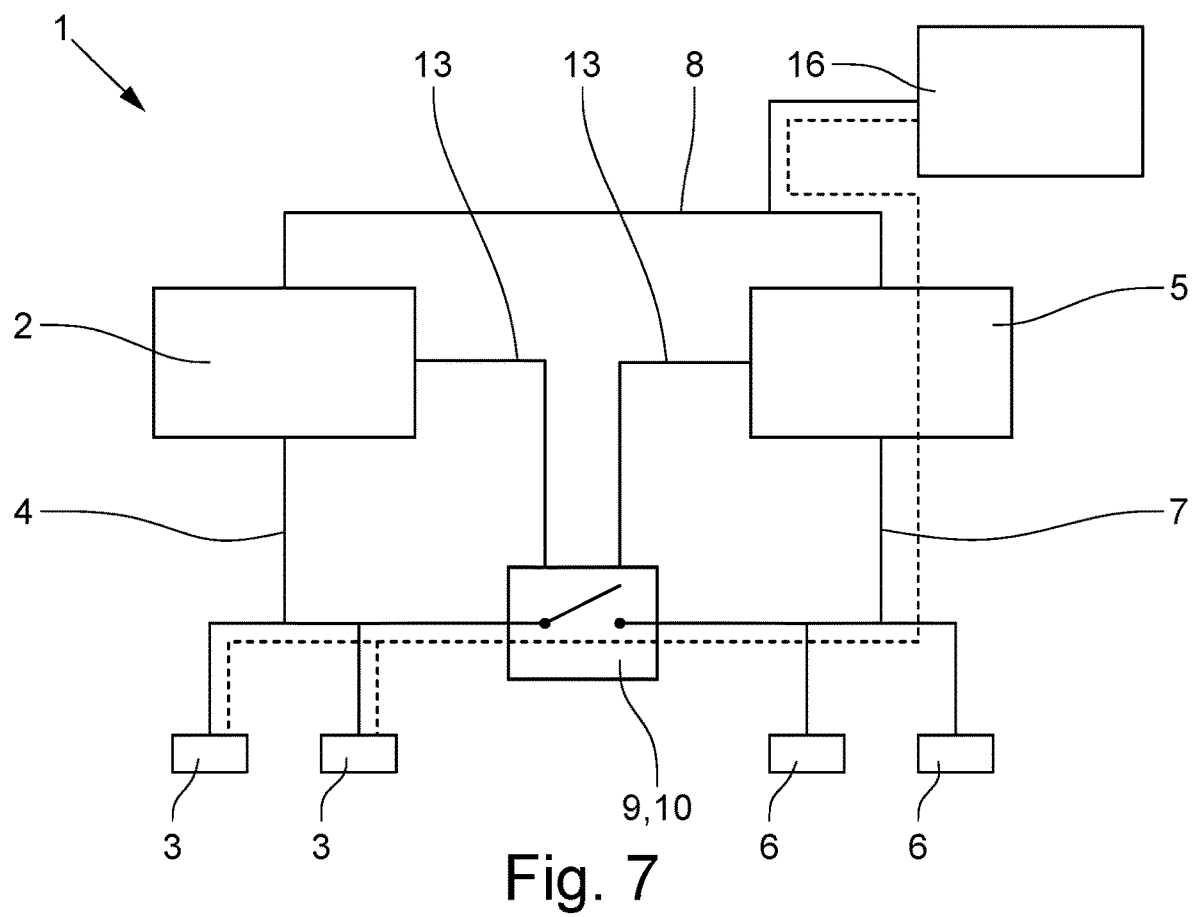
FIG. 7 illustrates a seventh embodiment of a bus system in the go state of the transmitting first bus subscriber and the transmitting second bus subscriber.

FIG. 7 shows another variation of a bus system 1. In addition to the transmitting first bus subscriber 2 and the transmitting second bus subscriber 5, the bus system 1 shown has a transmitting substitute bus subscriber 16. The transmitting substitute bus subscriber 16 is connected to the transmitting first bus subscriber 2 and the transmitting second bus subscriber 5 via the monitoring communication channel 8. The bus system is shown in the go state of the two transmitting bus subscribers 2, 5. The data for configuring and/or for controlling the receiving bus subscribers 3, 6 and/or characterization information of the receiving bus subscribers 5, 6 are stored in the transmitting substitute bus subscriber. The transmitting substitute bus subscriber 16 is designed such that it transmits control commands to the receiving first bus subscriber 3 in the fault state of the transmitting first bus subscriber 2 or transmits control commands to the receiving second bus subscriber 6 in the fault state of the transmitting second bus subscriber 5. The receiving bus subscribers 3, 6 are correspondingly designed to execute the control commands of the transmitting substitute bus subscriber 16.

The communication path of the transmitting substitute bus subscriber 16 in the event that the transmitting first bus subscriber 2 is in the fault state is shown in dashed lines. In this case, the first data bus 4 and the second data bus 7 would then be connected to each other via the switching device 10. The transmitting substitute bus subscriber 16 uses the transmitting second bus subscriber 5 as an interface to the second data bus 7 and transmits its control commands to the receiving first bus subscribers 3 via the monitoring communication channel 8, the transmitting second bus subscriber 5, the second data bus 7 and the first data bus 4.

The invention claimed is:

1. A bus system for a process system, comprising:
a transmitting first bus subscriber which transmits bus messages and a receiving first bus subscriber which receives bus messages, wherein the transmitting first bus subscriber and the receiving first bus subscriber are connected to one another via a first data bus, wherein the transmitting first bus subscriber transmits first control commands to the receiving first bus subscriber, wherein the receiving first bus subscriber executes the first control commands of the transmitting first bus subscriber;
a transmitting second bus subscriber;
a receiving second bus subscriber;
wherein the transmitting second bus subscriber and the receiving second bus subscriber are connected to one another via a second data bus;
wherein the transmitting second bus subscriber transmits second control commands to the receiving second bus subscriber;

wherein the receiving second bus subscriber executes the second control commands of the transmitting second bus subscriber;

wherein the transmitting first bus subscriber and the transmitting second bus subscriber are connected to one another via a monitoring communication channel and functionally monitor one another;

wherein the first data bus and the second data bus can be connected to one another and disconnected from one another via a switching device which can be controlled by a circuit;

wherein the first data bus and the second data bus are disconnected from one another in a simultaneous go state of the transmitting first bus subscriber and of the transmitting second bus subscriber;

wherein, in a fault state of the transmitting second bus subscriber, the circuit connects the first data bus and the second data bus to each other via the switching device so that the transmitting first bus subscriber is connected to the receiving first bus subscriber and the receiving second bus subscriber, and in a fault state of the transmitting first bus subscriber, the circuit connects the first data bus and the second data bus to each other via the switching device so that the transmitting second bus subscriber is connected to the receiving first bus subscriber and the receiving second bus subscriber; and wherein, in the fault state of the transmitting second bus subscriber, the transmitting first bus subscriber transmits the first control commands to the receiving first bus subscriber and transmits the second control commands to the receiving second bus subscriber, and in the fault state of the transmitting first bus subscriber, the transmitting second bus subscriber transmits the first control commands to the receiving first bus subscriber and transmits the second control commands to the receiving second bus subscriber.

2. The bus system according to claim 1, wherein the receiving first bus subscriber transmits first status data about a current operating status of the receiving first bus subscriber or first data characterizing a process environment to the transmitting first bus subscriber, and the receiving second bus subscriber transmits second status data about a current operating status of the receiving second bus subscriber or second data characterizing the process environment to the transmitting second bus subscriber; and wherein the receiving first bus subscriber at least partially stops transmitting the first status data or the first data characterizing the process environment in the fault state of the transmitting first bus subscriber, and the receiving second bus subscriber at least partially stops transmitting the second status data or the second data characterizing the process environment in the fault state of the transmitting second bus subscriber.

3. The bus system according to claim 2, wherein, in the fault state of the transmitting first bus subscriber, the transmitting first bus subscriber, the transmitting second bus subscriber and the transmitting substitute bus subscriber prompt the receiving first bus subscriber to at least partially stop transmitting the first status data and/or the first data characterizing the process environment, and in the fault state of the transmitting second bus subscriber, the transmitting first bus subscriber, the transmitting second bus subscriber and the transmitting substitute bus subscriber prompt the receiving second bus subscriber to at least partially stop transmitting the second data and/or the second data characterizing the process environment; or wherein the receiving first bus subscriber recognizes the fault state of the transmitting first bus subscriber and independently at least partially stops the transmission of the first status data or the first data characterizing the process environment, and the receiving second bus subscriber recognizes the fault state of the transmitting second bus subscriber and independently at least partially stops the transmission of the second status data or the second data characterizing the process environment.

4. The bus system according to claim 1, wherein the monitoring communication channel is implemented as an analog, digital, wireless or wired communication channel.

5. The bus system according to claim 1, wherein the circuit is implemented as a separate bus subscriber.

6. The bus system according to claim 1, wherein a moderating first bus subscriber and a moderating second bus subscriber are provided;

wherein the moderating first bus subscriber moderates communication between the transmitting first bus subscriber and the receiving first bus subscriber and the moderating second bus subscriber moderates communication between the transmitting second bus subscriber and the receiving second bus subscriber; and wherein, in the fault state of the transmitting first bus subscriber, the moderating first bus subscriber is deactivated and the moderating second bus subscriber moderates communication between the transmitting second bus subscriber and the receiving first bus subscriber or, in the fault state of the transmitting second bus subscriber, the moderating second bus subscriber is deactivated and the moderating first bus subscriber moderates the communication between the transmitting first bus subscriber and the receiving second bus subscriber.

7. The bus system according to claim 6, wherein the moderating first bus subscriber and the moderating second bus subscriber are implemented as separate bus subscribers; or wherein the moderating first bus subscriber and the moderating second bus subscriber are provided in the circuit; or wherein the moderating first bus subscriber is implemented in the transmitting first bus subscriber and moderating second bus subscriber is implemented in the transmitting second bus subscriber.

8. The bus system according to claim 1, wherein the circuit is a first circuit;

wherein a second circuit is provided;

wherein the first circuit is implemented in the transmitting first bus subscriber; and wherein the second circuit is implemented in the transmitting second bus subscriber wherein the switching device is configured such that at least one of:
  a first switch connected to the switching device via a first switching channel and switches the switching device via the first switching channel, and a second switch is connected to the switching device via a second switching channel and switches the switching device via the second switching channel;
  the switching device is connected to the monitoring communication channel, and the first circuit and the second circuit switch the switching device via the monitoring communication channel;
  the first circuit switches the switching device via the first data bus, and the second circuit switches the switching device via the second data bus.

9. The bus system according to claim 1, wherein switch independently detects the fault state of the transmitting first bus subscriber or the fault state of the transmitting second bus subscriber; or
    wherein the transmitting first bus subscriber transmits a first fault signal to the circuit in the fault state of the transmitting second bus subscribers, and the transmitting second bus subscriber transmits a second fault signal to the circuit in the fault state of the transmitting first bus subscriber.

10. The bus system according to claim 1, wherein the circuit is a first circuit and the switching device is a first switching device;
    wherein a second circuit and a second switching device are provided;
    wherein the first circuit and the first switching device are implemented in the transmitting first bus subscriber and the second circuit and the second switching device are implemented in the transmitting second bus subscriber;
    wherein the transmitting first bus subscriber can be connected to the second data bus via the first switching device and can be disconnected from the second data bus; and
    wherein the transmitting second bus subscriber can be connected to the first data bus via the second switching device and can be disconnected from the first data bus.

11. The bus system according to claim 1, wherein the transmitting first bus subscriber and the transmitting second bus subscriber transmit data for configuring and/or for controlling the receiving first bus subscribers and the receiving second bus subscriber and/or characterization information of the receiving first bus subscribers and the receiving second bus subscriber via the first data bus and the second data bus during initialization of the bus system;
    wherein the first data bus and the second data bus are connected to one another via the switching device when the bus system is initialized, and the circuit disconnects the first data bus and the second data bus via the switching device after the data has been exchanged; or
    wherein the transmitting first bus subscriber and the transmitting second bus subscriber exchange data for configuring and/or for controlling the receiving first bus subscriber and the receiving second bus subscriber and/or characterization information of the receiving first bus subscribers and the receiving second bus subscriber via the monitoring communication channel during initialization of the bus system and/or during operation of the bus system.

12. The bus system according to claim 1, wherein, in the fault state of the transmitting second bus subscriber, the transmitting first bus subscriber places the receiving second bus subscriber in a follow-up mode such that the receiving second bus subscriber executes the first control commands directed to the receiving first bus subscriber; or
    wherein, in the fault state of the transmitting first bus subscriber, the transmitting second bus subscriber puts the receiving first bus subscriber into a slave mode such that the receiving first bus subscriber executes the second control commands directed to the receiving second bus subscriber.

13. The bus system according to claim 1, wherein the circuit connects the first data bus and the second data bus via the switching device during the fault state of the transmitting first bus subscriber or the fault state of the transmitting second bus subscriber, or a requested response of one of the transmitting first bus subscribers and the transmitting second bus subscriber fails to occur, or one of the transmitting first bus subscriber and the transmitting second bus subscriber is switched off.

14. A bus system for a process system, comprising:
    a transmitting first bus subscriber which transmits bus messages and a receiving first bus subscriber which receives bus messages, wherein the transmitting first bus subscriber and the receiving first bus subscriber are connected to one another via a first data bus, wherein the transmitting first bus subscriber transmits first control commands to the receiving first bus subscriber, wherein the receiving first bus subscriber executes the first control commands of the transmitting first bus subscriber;
    a transmitting second bus subscriber; and
    a receiving second bus subscriber;
    wherein the transmitting second bus subscriber and the receiving second bus subscriber are connected to one another via a second data bus;
    wherein the transmitting second bus subscriber transmits second control commands to the receiving second bus subscriber;
    wherein the receiving second bus subscriber executes the second control commands of the transmitting second bus subscriber;
    wherein the transmitting first bus subscriber and the transmitting second bus subscriber are connected to a transmitting substitute bus subscriber via a monitoring communication channel;
    wherein the transmitting substitute bus subscriber functionally monitors the transmitting first bus subscriber and the transmitting second bus subscriber;
    wherein the first data bus and the second data bus can be connected to one another and disconnected from one another via a switching device which can be controlled by a circuit, wherein the first data bus and the second data bus are disconnected from one another in a simultaneous go state of the transmitting first bus subscriber and of the transmitting second bus subscriber;
    wherein, in a fault state of the transmitting first bus subscriber or in a fault state of the transmitting second bus subscriber, the circuit connects the first data bus and the second data bus to one another via the switching device so that, in the fault state of the transmitting first bus subscriber, the transmitting substitute bus subscriber is connected to the receiving first bus subscriber via the monitoring communication channel, the transmitting second bus subscriber, the first data bus, and the second data bus, and in the fault state of the transmitting second bus subscriber, the transmitting substitute bus subscriber is connected to the receiving second bus subscriber via the monitoring communication channel, the transmitting first bus subscriber, the first data bus, and the second data bus; and
    wherein, in the fault state of the transmitting first bus subscriber, the transmitting substitute bus subscriber transmits the first control commands to the receiving first bus subscriber or, in the fault state of the transmitting second bus subscriber, the transmitting substitute bus subscriber transmits the second control commands to the receiving second bus subscriber.

15. The bus system according to claim 14, wherein the transmitting first bus subscriber and the transmitting second bus subscriber transmit data for configuring and/or for controlling the receiving first bus subscribers and the receiving second bus subscriber and/or characterization information of the receiving first bus subscribers and the receiving second bus subscriber to the transmitting substitute bus subscriber via the monitoring communication channel during initialization of the bus system and/or during ongoing operation of the bus system.

* * * * *